(12) United States Patent
Cismas et al.

(10) Patent No.: US 9,588,745 B1
(45) Date of Patent: Mar. 7, 2017

(54) CUSTOMIZABLE SERVICE DELIVERY SYSTEM WITH SCALABLE WORKFLOW

(71) Applicant: BANK OF AMERICA CORPORATION, Charlotte, NC (US)

(72) Inventors: Marina Cismas, Southlake, TX (US); David L. Underwood, Stanley, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/882,033

(22) Filed: Oct. 13, 2015

(51) Int. Cl.
*G06F 9/44* (2006.01)

(52) U.S. Cl.
CPC . *G06F 8/34* (2013.01); *G06F 8/31* (2013.01)

(58) Field of Classification Search
None
See application file for complete search history.

(56) References Cited

U.S. PATENT DOCUMENTS

| | | | |
|---|---|---|---|
| 5,950,010 A * | 9/1999 | Hesse | G06F 8/61 709/220 |
| 6,675,149 B1 | 1/2004 | Ruffin et al. | |
| 6,868,413 B1 | 3/2005 | Grindrod et al. | |
| 7,647,021 B2 | 1/2010 | Moore et al. | |
| 7,949,628 B1 | 5/2011 | Blazek et al. | |
| 8,051,154 B2 | 11/2011 | Benny et al. | |
| 8,321,803 B2 * | 11/2012 | Benedetti | G06Q 10/00 707/694 |
| 8,327,351 B2 * | 12/2012 | Paladino | G06F 8/71 7/106 |
| 8,402,426 B2 * | 3/2013 | Alfandary | G06Q 10/087 7/102 |
| 8,407,080 B2 | 3/2013 | Jayaraman et al. | |
| 8,706,682 B1 | 4/2014 | Blazek et al. | |
| 8,706,800 B1 | 4/2014 | Ahmed et al. | |
| 8,762,451 B2 * | 6/2014 | Katzin | G06Q 30/06 709/203 |
| 8,799,449 B2 | 8/2014 | Schuckenbrock et al. | |

(Continued)

FOREIGN PATENT DOCUMENTS

EP          2603855 A2     6/2013

*Primary Examiner* — Evral E Bodden
(74) *Attorney, Agent, or Firm* — Michael A. Springs; Moore & Van Allen PLLC; Nicholas C. Russell (57) ABSTRACT

Embodiments of the invention are directed to a system, method, or computer program product for providing an entity wide customizable service or application delivery system that is scalable. As such, the invention allows effective management and delivery of customizable services or service bundles to users with various requirements. As provided, the invention includes a unique scalable workflow system to effectively manage and deliver customizable services or service bundles to users, where the user requirements for the services may vary from one another. The invention allows for on-the-spot profile and service portfolio customization by application support and capacity planning. Users may dynamically adjust their service selections to better reflect their application need changes. All steps are performed as self-service through an interface generated via the system. It allows for seamless integration of reporting, controls, accountability, and optimizes service delivery process.

17 Claims, 6 Drawing Sheets

(56) References Cited

U.S. PATENT DOCUMENTS

| | | |
|---|---|---|
| 8,930,953 B2 * | 1/2015 | Chalemin ............ G06F 9/45533 |
| | | 8/104 |
| 9,031,993 B2 | 5/2015 | Bishop et al. |
| 9,100,295 B2 | 8/2015 | Neill et al. |
| 9,110,934 B2 | 8/2015 | Bailey et al. |
| 9,191,380 B2 | 11/2015 | Anderson et al. |
| 9,274,848 B2 | 3/2016 | Dawson et al. |
| 9,354,852 B2 * | 5/2016 | Babey ....................... G06F 8/61 |
| 9,361,595 B2 | 6/2016 | Karve et al. |
| 9,363,107 B2 * | 6/2016 | Pasternak ............ H04L 12/6418 |
| 2001/0016880 A1 | 8/2001 | Cai et al. |
| 2003/0179775 A1 | 9/2003 | Carolan et al. |
| 2006/0235897 A1 | 10/2006 | O'Hara |
| 2007/0100981 A1 | 5/2007 | Adamczyk et al. |
| 2008/0183852 A1 | 7/2008 | Pramer et al. |
| 2008/0215560 A1 | 9/2008 | Bell et al. |
| 2009/0012800 A1 | 1/2009 | Devarakonda et al. |
| 2009/0187413 A1 | 7/2009 | Abels et al. |
| 2010/0036751 A1 | 2/2010 | Eidt et al. |
| 2013/0054776 A1 * | 2/2013 | Kunze ................... G06F 9/5061 |
| | | 709/224 |
| 2013/0247005 A1 * | 9/2013 | Hirsch ....................... G06F 8/71 |
| | | 717/121 |
| 2014/0181255 A1 | 6/2014 | Thomas et al. |
| 2014/0298441 A1 | 10/2014 | Yamaguchi et al. |
| 2016/0004520 A1 * | 1/2016 | Gourmelen ............... G06F 8/60 |
| | | 7/120 |

* cited by examiner

CUSTOMIZABLE SERVICE DELIVERY SYSTEM WITH SCALABLE WORKFLOW

BACKGROUND

Traditionally, entities have large information technology infrastructures for maintaining and installing applications across computer systems and maintaining general workflow within the entity. Typically the information technology infrastructure comprises several system servers that include applications that require deployment among users based on user application needs.

Each entity may have one or more systems designated to serve one or more different operating system platforms within an entity. Of course, with the advancement technology each part of the information technology infrastructure, such as application deployment, management, servicing of applications, and customization needs to be regularly provided, maintained, and upgraded.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for providing an entity wide customizable service delivery system that is scalable allowing effective management and delivery of customizable services or service bundles to users with various requirements.

As provided, the invention includes a unique scalable workflow system to effectively manage and deliver customizable services or service bundles to users, where the user requirements for the services may vary from one another. The invention allows for on-the-spot profile and service portfolio customization by application support and capacity planning. Users may dynamically adjust their service selections to better reflect their application need changes. All steps are performed as self-service through an interface generated via the system. It allows for seamless integration of reporting, controls, accountability, and optimizes service delivery process.

Currently, large entities have large information technology infrastructures, which include large server environments. These environments may include multiple logical partitions, database management systems, and the like. As such, application or service rollouts and/or customization demands from one or more users may occur at different phases within the server environment's multiple logical partitions. Not only at different phases, but also at different requirements for each application. Furthermore, in a large server environment, there are typically multiple users all with different application or service requirements and different functionality requirements within any one or more applications.

In current entity environments requests for customized application, new applications, or services for applications from a user may be received by an individual on a one off basis via e-mail or the like. At that point the individual would have to discuss the application with the user and walk through the building of the application with a planner. Subsequently, additional users may desire a similar application, which would have to be built individually based on the request.

As such, the present invention providing an entity wide scalable workflow system for delivery of services and/or applications and management of the same. In this way, removing the complexity and different processes in deployment and maintenance of applications across an entity, providing a uniform and stable method of providing deployment, maintenance, and tracking across the entire entity. As such, anyone within the entity may be able to customize, track, service, and maintain applications in a unified location. Furthermore, the various groups that build and maintain the applications for the one or more various server environments may have a common process with consistent methodology to accurately report on maintenance levels per product, system, logical partition, or the like.

In some embodiments, the system creates a scalable standardized process for customizing, servicing, and delivering applications to users. In this way, the user, via a system interface, may define a set of services that they need to perform one or more operations. Once selected, the system may generate a build for the user, assign a liaison, build in reminders, provide audits, incorporate capacity planning, provide self-service collaboration, and synchronize the application build with the entity.

Furthermore, the system is designed for applications to be available for customization and subscription. The system offers a tracking mechanism for tracking and monitoring the applications on a user system. The system offers a suite of service via a user interface dashboard for forecasts, health checks, self-services, and advanced services. The self-services allow for accountability of the user to complete reviews, self-assessments, and the like. The system allows for application owners to build a customized services profile, allowing for selection of frequency, provider liaisons, and application start dates.

As such, the system provides a simple, optimized guaranteed delivery of applications to a user. Furthermore, the system is capable of provided deployment of large estate of applications without necessity of personnel to provide deployment due to shared accountability of the recurring review process. The centralized system allows for accountability of recurring reviews across the infrastructure and for audit tracking as necessary.

Embodiments of the invention relate to systems, methods, and computer program products for customizable application building, servicing, and delivery, the invention comprising separating each function of the compiled applications and store each function separately; generating an interface for user interaction, wherein the interface is provided to a user via a user device through a secure communicable link generated for interface interaction; receiving a request for a customized application via the interface, wherein the customized application includes applications and functions of applications; planning the customized application based on the received request, wherein planning the customized application comprises performing a capacity assessment of the user device; implementing the customized application on the user device, wherein implementation includes creating a second secure communicable link to transmit the customized application to the user device; and synchronizing the customized application with entity servers and coordinate update and maintenance requirements for the customized application.

In some embodiments, the invention further comprises receiving maintenance update products from one or more vendors for the applications; incorporating a tracking module into the maintenance update products and apply maintenance update to an appropriate location within the entity information technology infrastructure; generating a report of the progress of the maintenance update based on the executed tracking module for each of one or more maintenance update products applied within the entity; and providing the user with the report of the progress of the maintenance update associated with the tracking module via the interface, wherein the provided report is based on a user query for the report.

In some embodiments, receiving the a request for a customized application via the interface further comprises receiving a request for one or more complete applications and a request for one or more functions of a second application.

In some embodiments, the capacity assessment of the user device further comprises communicably linking with the user device to identify memory capacity and compatibility of the user device to ensure application functionality upon delivery.

In some embodiments, compiling the applications available across the entity into a centralized location database further comprises extracting applications available for the entity from one or more vendors. In some embodiments, compiling applications available across the entity into a centralized location database further comprises parting out the applications such that each function of the application is stored separately.

In some embodiments, implementing the customized application on the user device further comprises assigning and deploying a liaison to the user for application reconciliation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user" or "agent." It will be appreciated by someone with ordinary skill in the art that the user may be an individual, financial institution, corporation, or other entity that may have been involved in the instillation of software maintenance and/or wishes to view the progress of a maintenance deployment within the entity providing the system.

The term "maintenance update" or "maintenance fix" or "maintenance" as used herein may refer to any software instillation or update that may occur within an entity. This may include any updates, patches, fixes, programs, new instillations, new versions, or the like. The software may be installed in or for any portion of the entity. This may include instillation in any portion of an entity's information technology infrastructure, which may include any server environment, logical partition, database systems, software libraries, or the like. Furthermore, at any given time one or more maintenance rollouts may occur at different phases within the entity.

In accordance with embodiments of the invention, the term "information technology" as used herein refers to the totality of interconnecting hardware and software that supports the flow and processing of information. Information technology include all information technology resources, physical components, and the like that make up the computing, internet communications, networking, transmission media, or the like of an entity.

Currently, large entities have large information technology infrastructures, which include large server environments. These environments may include multiple logical partitions, database management systems, and the like. As such, multiple maintenance rollouts may occur at different phases within the server environment's multiple logical partitions. Furthermore, in a large server environment, there are typically multiple copies of the software libraries all with different maintenance required with no easy way of knowing the specific maintenance level of the software contained in each of the libraries.

Furthermore, applications may be referred to throughout, these applications may be any type of software or hardware application that a user within an entity may desire or require.

Furthermore, applications may include one or more services or service bundles associated with an application. As such, the term application as used herein may include the application and/or any services associated with the application. Applications may be distributed throughout the entity and customized at various different levels for user utilization. As such, developing a customized application and applying it is an individual by individual basis. Creating a scalable customizable workflow system that integrates, develops, and deploys customized applications allows for a centralized application customization deployment and maintenance.

In this way, keeping track of customized application, the status of maintenance assignments, and the like are all done centrally. Previously, manual tracking of maintenance and application building for each group was then combined with the other manual tracking of maintenance for other groups across the entity to attempt to provide overview of the tracking application customization and maintenance within the entire entity's information technology infrastructure. However, this manual input requires time and is out of date with respect to maintenance shortly after input.

As such, the present invention providing an entity wide application generation and delivery system with scalable workflow for effective management and delivery of customizable service or service bundles to users/applications with various requirements. Thus the system removes the complexity and different processes in customizing and maintenance applications across the groups of an entity to provide a uniform and stable method of application workflow across the entire entity. As such, anyone within the entity may be able to request and track maintenance across the entity in a unified location.

Embodiments of the invention are directed to a system, method, or computer program product for a distributive network system with specialized data feeds associated with the distributive network for receiving requests for applications, building customized applications, deploying applications, maintaining applications, and monitoring applications across an entity.

Figure 1:
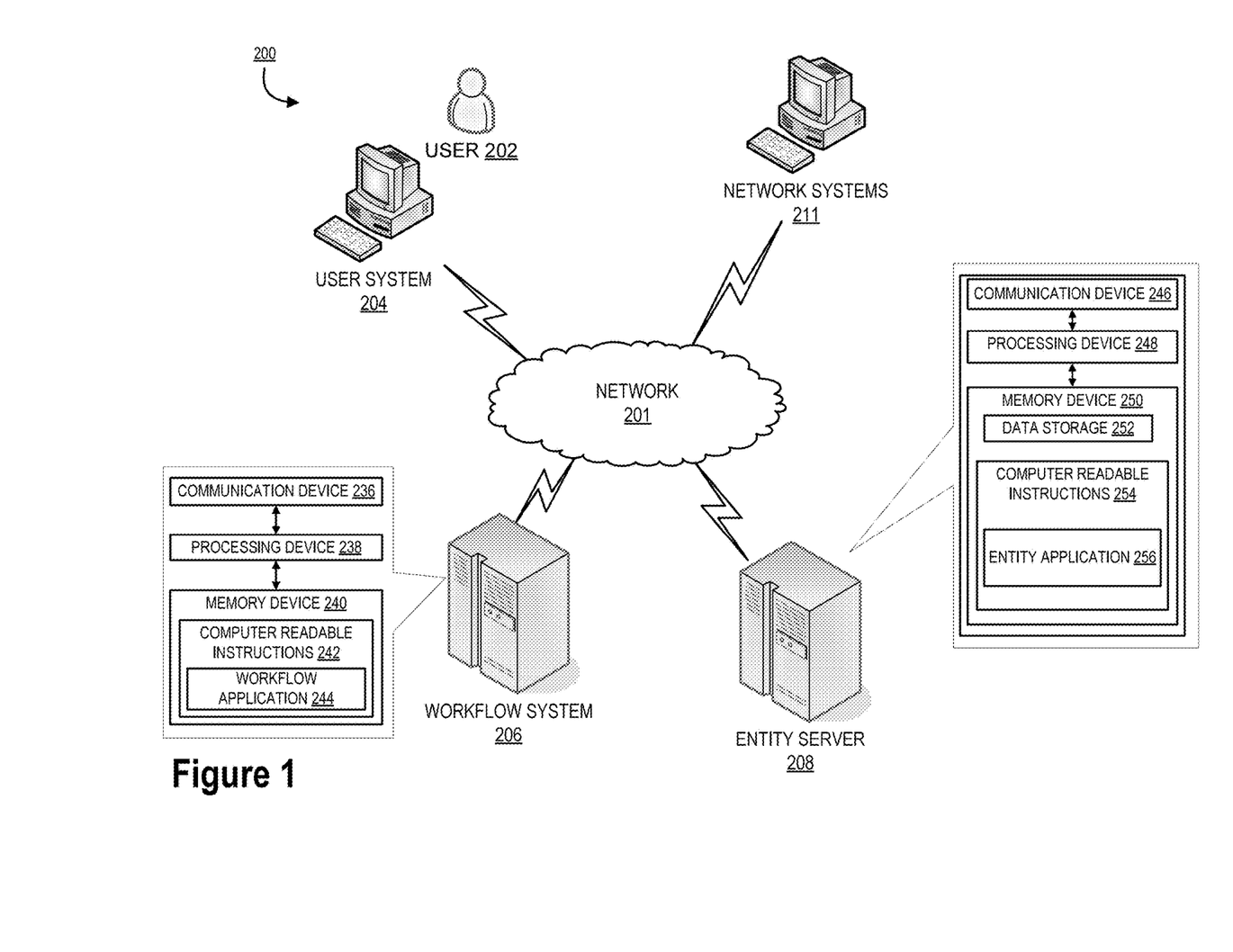
FIG. 1 provides an illustration of a scalable service delivery environment, in accordance with various embodiments of the invention.

FIG. 1 provides an illustration of a scalable service delivery environment 200, in accordance with various embodiments of the invention. As illustrated in FIG. 1, the entity server 208 is operatively coupled, via a network 201 to the user system 204, network systems 211, and the workflow system 206. In this way, the entity server 208 can send information to and receive information from the user system 204, network systems 211, and the workflow system 206 to facilitate the entity wide application building, servicing, and deployment.

FIG. 1 illustrates only one example of an embodiment of scalable service delivery environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that an affiliation with the entity. In some embodiments, the user 202 may be a programmer or the like associated with maintaining the entity's information technology infrastructure. In this way, the user 202 may be a customer, vendor, or the like of the entity. As such, the user 202 may require applications for completing roles within the entity. In some embodiments, the user 202 may be an individual or business with a relationship with the use or maintenance of software, systems, and/or programs associated with the entity. Furthermore, multiple individuals or entities may comprise a user 202.

FIG. 1 also illustrates a user system 204. The user system 204 is operatively coupled to the entity server 208, network systems 211, and/or the workflow system 206 through the network 201. The user system 204 has systems with devices the same or similar to the devices described below for the entity server 208 and/or the workflow system 206 (e.g., communication device, processing device, and memory device). Therefore, the user system 204 may communicate with the entity server 208, network systems 211, and/or the workflow system 206 in the same or similar way as described with respect to each system.

The user system 204, in some embodiments, is comprised of systems and devices that allow for a user 202 to request customizable applications via secure communication channels associated with the entity, receive and store the applications provided, and receive automatic maintenance update progress reports. A "user device" 204 may be any computer communication device or mobile device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, desktop computers, cameras, video recorders, audio/video player, radio, GPS devices, any combination of the aforementioned, or the like. Although only a single user system 204 is depicted in FIG. 1, the system environment 200 may contain numerous user systems 204, as appreciated by one of ordinary skill in the art.

As illustrated in FIG. 1, the entity server 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 248 uses the communication device 246 to communicate with the network 201 and other devices on the network 201, such as, but not limited to the user system 204, network systems 211, and/or workflow system 206 over a network 201. As such, the communication device 246 generally comprises a modem, server, or other device for communicating with other devices on the network 201.

As further illustrated in FIG. 1, the entity server 208 comprises computer-readable instructions 254 stored in the memory device 250, which in one embodiment includes the computer-readable instructions 254 of an entity application 256. In some embodiments, the memory device 250 includes data storage 252 for storing data related to the entity application 256 including but not limited to data created and/or used by the entity application 256.

In the embodiments illustrated in FIG. 1 and described throughout much of this specification, the entity application 256 may provide the infrastructure for the entire entity, maintain and allow for running of applications within the entity.

In some embodiments, the entity application 256 receives maintenance updates for applications. The entity application 256 may receive maintenance update from vendors. The maintenance updates may be received from a vendor via one or more vendor systems. In this way, when a vendor has a fix, update, new product release, or the like, the vendor may communicate via a vendor system the update to the entity server 208 via the network 201. Each of the one or more updates may be sent directly to the entity server 208 for providing maintenance throughout the entity. As such, the entity application 256 may receive the maintenance update and direct it to the appropriate logical partition associated with the entity sever 208. In some embodiments, the updates may be received by the entity application 256 from one or more locations within the entity.

In some embodiments, the entity application 256 maintains entity information technology. As such, the entity server 208 may maintain and update any and all application software and hardware associated with an entity. As such, the entity application 256 manages all application software instillations and updates associated with the entity. In this way, the entity application 256 may communicate using the communication device 246 through the network 201 to the network systems 211 associated with agents of the entity. In some embodiments, the entity application 256 may also receive new application software or software updates for the entity's logical partitions and software associated with user systems 204 and network systems 211.

Furthermore, the entity application 256 may communicate with the workflow system 206 to monitor each of the one or more maintenance updates being implemented at any given time and to report the maintenance updates to users or other entity agents monitoring the updates.

As illustrated in FIG. 1, the workflow system 206 generally comprises a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the entity server 208, the user system 204, and/or the network systems 211. As such, the communication device 236 generally comprises a modem, server, or other device for communicating with other devices on the network 201.

As further illustrated in FIG. 1, the workflow system 206 comprises computer-readable instructions 242 stored in the memory device 240, which in one embodiment includes the computer-readable instructions 242 of a monitoring application 244. In some embodiments, the memory device 240 includes database storage for storing data related to the workflow application 244 including but not limited to data created and/or used by the workflow application 244.

In the embodiments illustrated in FIG. 1 and described throughout much of this specification, the workflow application 244 stores applications, generates interfaces for user deployment, builds applications, and aids in monitoring application maintenance.

In this way, the workflow application 244 may receive from vendors or from the entity server 208 applications for deployment to network systems 211 and/or user systems 204 within the entity. Once received, the application or application bundles may be stored in the memory device 240.

In some embodiments, the workflow application 244 may generate an interface of user request of applications. In this way, the workflow application 244 presents applications to a user that the user is authorized to implement onto his/her system. The applications may be searchable, customizable, or the like. The workflow application 244 may present these in an interface sent through a secured network to a user system 204.

In some embodiments, the workflow application 244 may receive a completed interface from a user requesting an application build. After a request is received, the workflow application 244 may perform audits, capacity planning, self-services, or the like on the user system 204 or network system 211. The workflow application 244 may, in conjunction with the entity server 208, build the customized application and subsequently deploy the application via secure communication link to the user system 204 or network system 221.

Once deployed, the workflow application 244 may also process, in some embodiments, the maintenance updates for the software applications. In this way, the workflow application 244 may determine the appropriate location for the maintenance update such as a network system 211, user system 204, logical partition, or the like. Subsequently, the workflow application 244 may direct the maintenance update to the appropriate location and initiate the installation of the update. In some embodiments, the workflow application 244 may code a tracking module and incorporate the tracking module into the maintenance update. Then the workflow application 244 may incorporate the tracking module and maintenance update into the appropriate location within the entity. In this way, the workflow application 244 may communicate to the network systems 211 in order to process and initiate maintenance updates that include tracking modules.

In some embodiments, the workflow application 244 may provide automatic monitoring of the application building, servicing, and maintenance update process. In this way, the workflow application 244 may provide reports regarding the status of one or more specific builds or updates to users or other agents automatically. This automatic reporting may be communicated from the workflow application 244 to the user 202 via the network 201. This automatic report may be generated at a given time point, at a given time interval, at stages of maintenance completion, at success/failure of maintenance or build, at a user 202 specified times, or the like. The report may be provided via electronic communication means, such as email. This report may provide general information about the progress of the maintenance update, the location of the build or update, the time it started, the run time, an estimated end time, the vendor, the installer, the liaison responsible for the application, the other locations the application or update is located within the entity, and the like Finally, in some embodiments, the workflow application 244 may synchronize applications within the entity with the entity server 208.

FIG. 1 also illustrates one or more network systems 211. The network systems 211 are operatively coupled to the entity server 208, user system 204, and/or the workflow system 206 through the network 201. The network systems 211 have systems with devices the same or similar to the devices described for the entity server 208 and/or workflow system 206 (e.g., communication device, processing device, and memory device). Therefore, the network systems 211 may communicate with the entity server 208, user system 204, and/or the workflow system 206 in the same or similar way as previously described with respect to each system. The network systems 211, in some embodiments, is comprised of systems and devices that allow for receiving applications and application bundles, receiving maintenance updates for running software, and the like. The network systems 211 are associated with the entity. In this way, the network systems 211 are computer systems associated with agents, users 202, or the like associated with lines of business, groups, subsidiaries, business partners, or the like associated with the entity.

FIG. 1 depicts only one network system 211 within the computing system environment 200, however, one of ordinary skill in the art will appreciate that a plurality of network systems 211 may be communicably linked with the network 201 and the other devices on connected to the network 201, such that each network system 211 is communicably linked to the network 201 and the other devices on the network 201.

Figure 2:
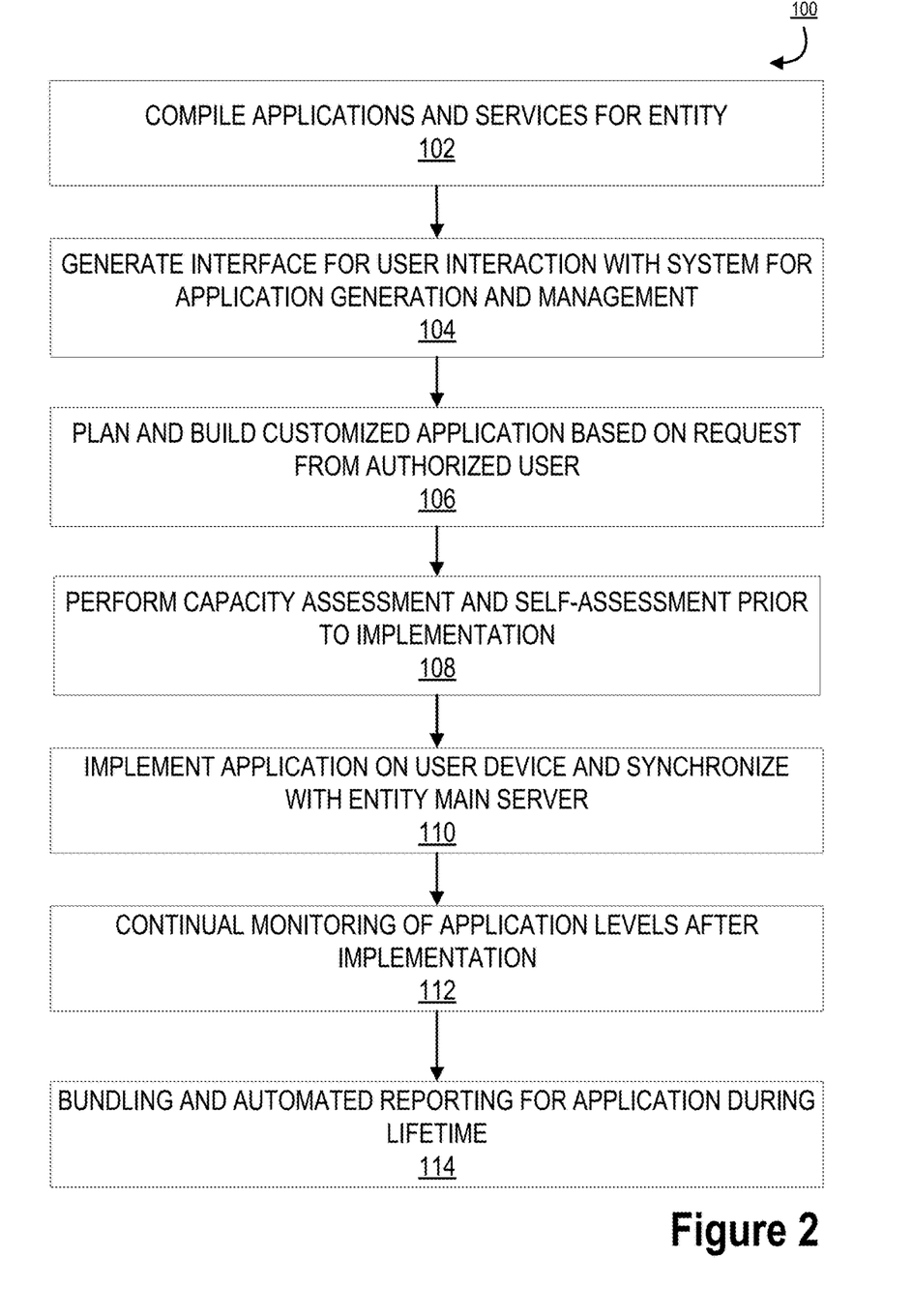
FIG. 2 provides a high level process flow illustrating the scalable service delivery workflow process, in accordance with embodiments of the invention.

FIG. 2 provides a high level process flow illustrating the scalable service delivery workflow process 100, in accordance with embodiments of the invention. As illustrated in block 102, the process 100 is initiated when the system compiles applications and services for the entity. In this way, the applications, application bundles, and other services available for use within the entity may be compiled and stored in a centralized database. As such, the system may be able to maintain, monitor, and deploy any applications to authorized users. Furthermore, the entity may then identify all applications available to the entity for use. In some embodiments, the system may compile current applications with current licenses or the like available within the entity. In some embodiments, the applications may be provided from vendors that are available for use at the entity.

Once the applications are compiled and stored within the system, the process 100 continues by generating an interface for user interactions with the system for application generation and management, as illustrated in block 104. The interface, as described in more details below provides a user access to all applications and application related data that the user is authorized for. In this way, the user may request applications, request customized applications, chat with liaisons, monitor applications, and/or the like.

As illustrated in block 106, upon selection of an application build by the user, the system may plan and build a customized application based upon the selection and request. The system may perform a capacity assessment and self-assessment for the user device to ensure the user device has the capacity to accept and properly run the built application, as illustrated in block 108. Self-assessment requires users that are signed up for the system to complete reviews and perform self-assessments for each application. The system or host may be able to monitor each of the one or more states of a self-assessment. In some embodiments, this check may occur prior to the building of the application. In some embodiments, this check may occur during the building of the application. In some embodiments, this check may occur after the building of the application. In still other embodiments, the check may be performed at regular intervals throughout the lifetime of an application and/or a user system. Self-assessments and self-services allow the user to have accountability of his/her applications, including the completion of reviews and the like. Furthermore, the self-assessment comprises a built in shared accountability view for the user and host to review and share application accountability, including maintenance, updating, capacity, and the like.

As illustrated in block 110, the process 100 continues upon implementation or deployment of the application on the user device or network device. Upon implementation or deployment, the system may synchronize the application build with the entity main servers for completion and monitoring purposes. Furthermore, in association with automated reporting, the system may clean up the legacy system or record associated with the applications and synchronize with application deployment, use, or integration with the entity main servers.

Next, as illustrated in block 112, the process 100 continues after implementation or deployment of applications on user devices. The system may continually monitor the application levels across the entity after implementation. As such, the system may monitor the day-in and day-out level sets of the applications. In this way, prior to subsequent builds, the system may generate and review a capacity profile of the applications before moving forward with future deployments. The continual monitoring allows for shared accountability between the user and the system for reviewing and sharing application accountability, including maintenance, updating, capacity, and the like.

Finally, as illustrated in block 114, the process 100 is completed by generating an automated reporting function for the users. As such, the system may bundle the user's application and allows for a single build view for the user via self-services. In this way, multiple servers may be illustrated in a cluster in order to provide a self-service view to the user. As such, server roll mapping may be implemented.

Figure 3:
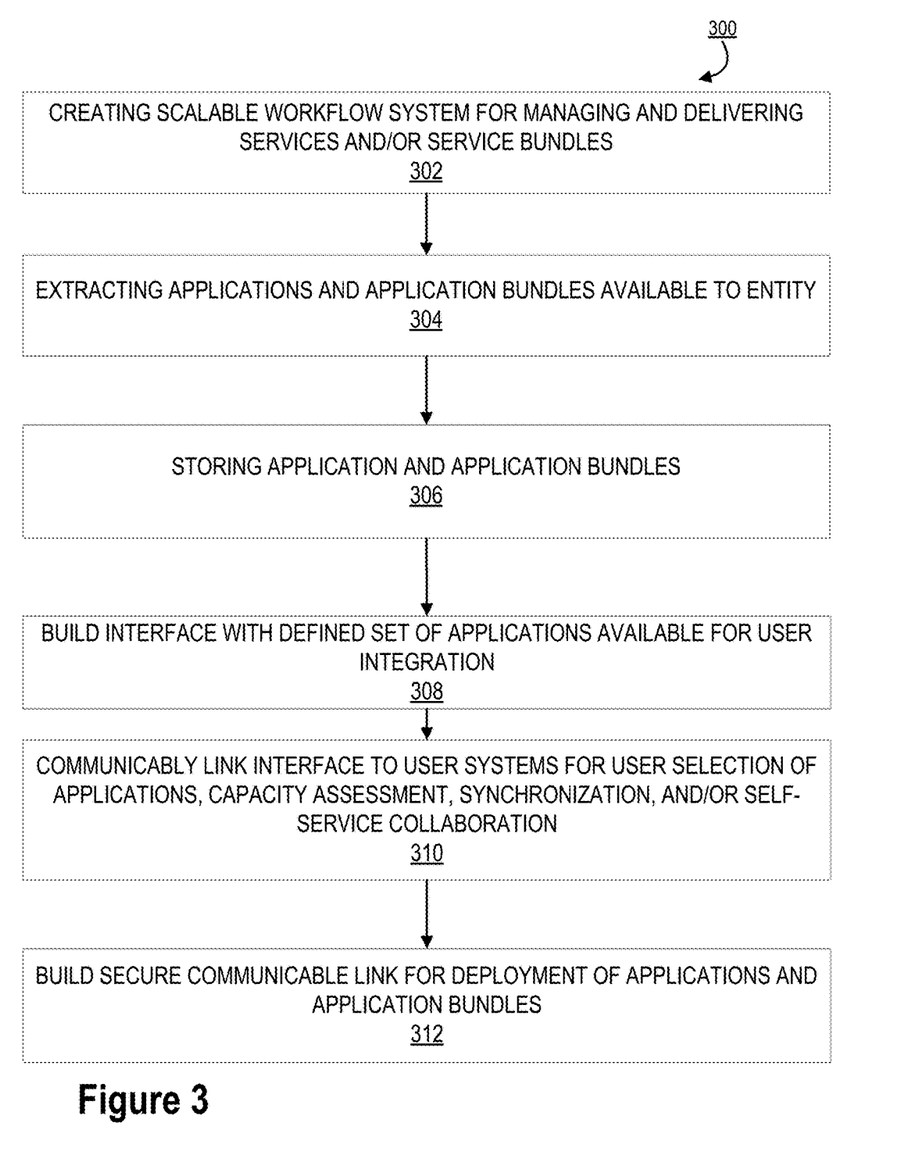
FIG. 3 provides a high level process flow illustrating the process of creating and the scalable service delivery system, in accordance with embodiments of the invention.

FIG. 3 provides a high level process flow illustrating the process of creating a scalable service delivery system 300, in accordance with embodiments of the invention. The process 300 is initiated when the system creates a scalable workflow system for managing and delivering applications and/or application bundle, as illustrated in block 302. In this way, the system may build a database for storage of one or more applications and application information associated therewith. Once the database is set up for storage of the applications, the process 300 continues by extracting applications and/or application bundles available to the entity, as illustrated in block 304. In this way, the system pulls all applications available to the entity from vendors, merchants, within the entity, and the like. Once all of the applications and the variations thereof are compiled, the system may store the application and/or application bundles in a database, as illustrated in block 306.

As illustrated in block 308, once the applications have been stored, the system may build an interface with a defined set of services available for user integration. In this way, the system may store applications based on accessibility by individual users. As such, authorized users may be allowed to access the applications and the customization of the applications built into the interface. In this way, the system defines the applications presented to the user based on the user's authentication level.

Next, as illustrated in block 310, the process 300 continues by creating a communicable link for the interface between the user device and the system for user selection of applications, capacity assessment of the user device, synchronization of user device to entity servers, and/or self-service collaboration for the user to allow the user to use the application to maximum capabilities. Finally, as illustrated in block 312, the process 300 is finalized by building a secure communicable link for deployment of the applications and/or application bundles.

Figure 4:
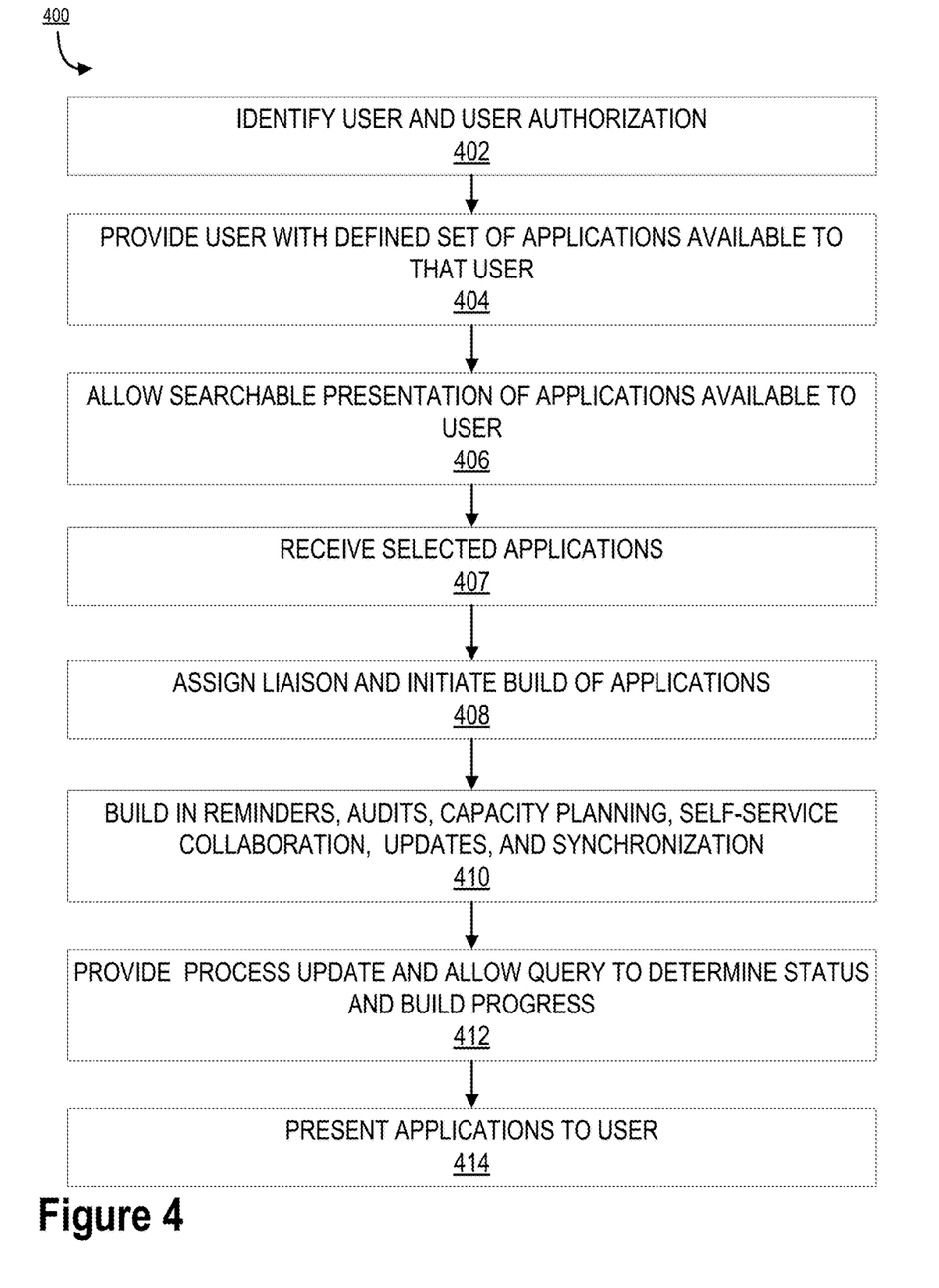
FIG. 4 provides an illustration of user interaction with the scalable service delivery system, in accordance with an embodiment of the invention.

FIG. 4 provides an illustration of user interaction with the scalable service delivery system 400, in accordance with an embodiment of the invention. As illustrated in block 402, the process 400 is initiated by identifying a user that is logging into the interface. As such, in some embodiments, the user may authenticate into the interface. In other embodiments, the system may identify the user device and authenticate the user based on the user device. As such, the system may identify the user and authenticate the level of access the user may have to one or more applications. In this way, some users may have authorization to access to all applications available to the entity and some users may have authorization to access one or more applications available to the user.

Once the user has been identified and authorized for access to the interface, the system may generate the interface and provide the user with the defined set of application available to the user based on his/her authorization, as illustrated in block 404. Once the interface is presented to the user via the user device, the system allows the user to search the applications that are available to him/her to identify the applications the user desires. Furthermore, the interface allows the user to customize each application available to him/her. Customization includes adding functionality, disabling functionality, interchanging various modules within the application, or the like. In this way, the system may build the application as requested by the user based on customization selections.

Next, as illustrated in block 406, the system may receive the applications selected by the user. In this way, the user may select via the interface the applications or customizations of the applications. Once selected, the system may receive the selected application and application services and compile the selections, as illustrated in block 407.

Once selected, the system may initiate a build of the application and assign a liaison for user interaction, as illustrated in block 408. The build may include pulling the requested applications and storing them in a bundle to be sent to the user via a secure communicable link. Furthermore, building the applications includes adding functionality, disabling functionality, interchanging various modules within the application, or the like. Once all building has been completed, the system may bundle the applications and prepare for sending the applications to the user device.

Next, as illustrated in block 410, the system may build in reminders, audits, capacity planning, self-service collaboration, updates, and finally synchronization of the applications with the entity system. In some embodiments, the system may build in reminders, these reminders may be one or more application posts, follow ups, function reminders, and/or the like. In some embodiments, the system may provide audits for the applications for internal and external auditing. In some embodiments, the system may provide capacity planning for the user device. In this way, the system may ensure that the user device has the capacity to function and run the applications selected by the user. In some embodiments, the system may provide self-service collaboration via the interface. In this way, the user may be able to access and collaborate with other users of the application in order to service the user's needs with respect to the application. Furthermore, self-service allows for accountability of users, such that users may be provided with reviews and assessments for completion regarding the applications. Furthermore, the system may be integrated into the self-services allowing the system to identify the stage of review the user has completed. In some embodiments, the system may provide updates for each of the one or more applications periodically and when necessary to keep the applications running. In some embodiments, the system may synchronize the applications with the entity system. Furthermore, updates may include automated reporting functionally. The automated reporting allows for self-service presentation to the user. In this way, the user is built a view of the applications he/he has via a clustering of servers for an overall view of the user to be presented via the system in a single report.

Next, as illustrated in block 412, the process 400 continues by providing process updates and allow for query by the user to determine status of the build and build progress. In this way, the interface is available for the user to query and constantly monitor the building of the application and follow up updates for the same.

Finally, as illustrated in block 414, the process 400 is finalized by presenting the applications to the user via the user device. In this way, the system may generate a secure communication link for presenting the applications to the user. The secured communication link may allow for communication and delivery of the applications to a user without interruption or corruption. The secure communication link may continue to be open for the user to communicate with the interface and liaison for continual update and maintenance for the user.

Figure 5:
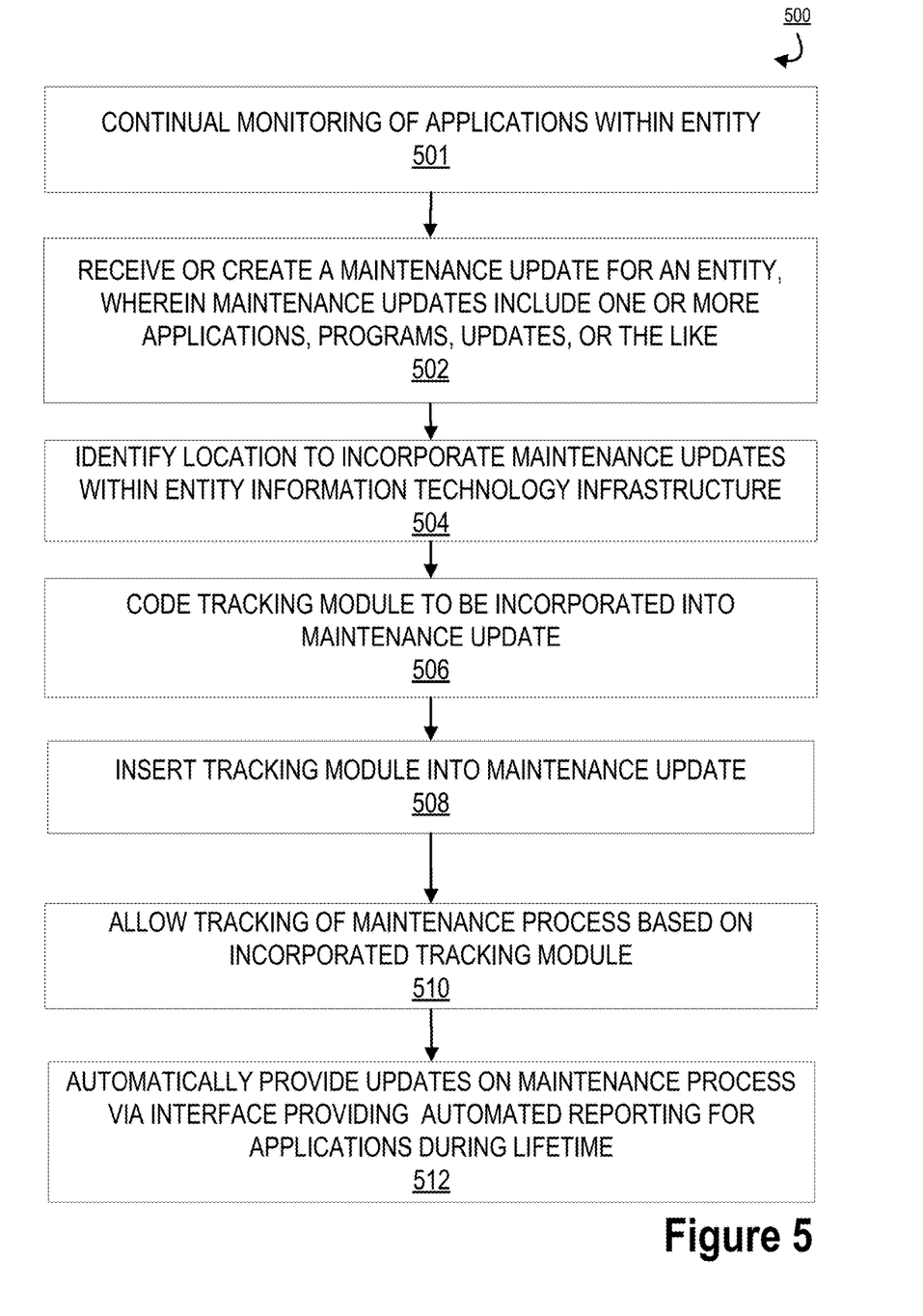
FIG. 5 provides an illustration of the process of providing maintenance and tracking of an application, in accordance with embodiments of the invention.

FIG. 5 provides an illustration of the process of providing maintenance and tracking of an application 500, in accordance with embodiments of the invention. This maintenance update may be for one or more systems or the like associated with the entity. The maintenance update may include one or more new application patches, application installations, software program installations, software updates, patches, fixes, new versions, or the like.

Initially, the system continually monitories the applications within the entity, as illustrated in block 501. In this way, whether the applications were built by the system, already integrated into the entity, or the like, the applications may be monitored by the workflow system. The monitoring of day-to-day levels associated with the application use, capacity, or the like. The continual monitoring allows for identification of over utilized or underutilized applications, maintenance requirements, reporting requirements, update requirements, or the like. This monitoring allows for the entity applications to be running at a consistent and operational level throughout the entity at any given time.

As illustrated in block 502, the process 500 is initiated when the system receives or creates a maintenance update for an entity, wherein the maintenance update includes one or more new application patches, application installations, software program installations, software updates, patches, fixes, new versions, or the like Next, as illustrated in block 504, the process 500 continues to identify the location to incorporate the maintenance updates within the information technology infrastructure of the entity. As such, a maintenance fix may be received from a vendor for specific programs or applications ran by the entity. Next, as illustrated in block 506, a tracking module coded for the particular maintenance update. As such, specific static information relating to the maintenance update may be inputted. Furthermore, specific data about the date and time of the maintenance fix upload as well as the agent uploading the maintenance fix may be coded into the tracking module.

Next, as illustrated in block 508, the coded tracking module may be inserted into the maintenance update. As such, the system may incorporate a module into a vendor provided maintenance update prior to dispersing the maintenance update out to the entity's information technology infrastructure. Subsequently, the maintenance update along with the tracking module may be installed into the proper location within the entity, such as one or more systems, user devices, network systems or the like associated with the entity. As illustrated in block 510, the process 500 allows tracking of the maintenance process based on the incorporated tracking module. In this way, a record of each maintenance update and the process associated therewith may be provided based on querying the interface associated with the maintenance update.

Finally, the process 500 completes by automatically providing a user with updates on the maintenance process via the interface if requested, as illustrated in block 512. In this way, when coding the tracking module in block 506, part of that code may include a list of one or more users that the system may automatically contact at various stages associated with the update. In this way, at each stage, a user may be aware of the update, the process, and if there are any errors associated with the update instillation.

Figure 6:
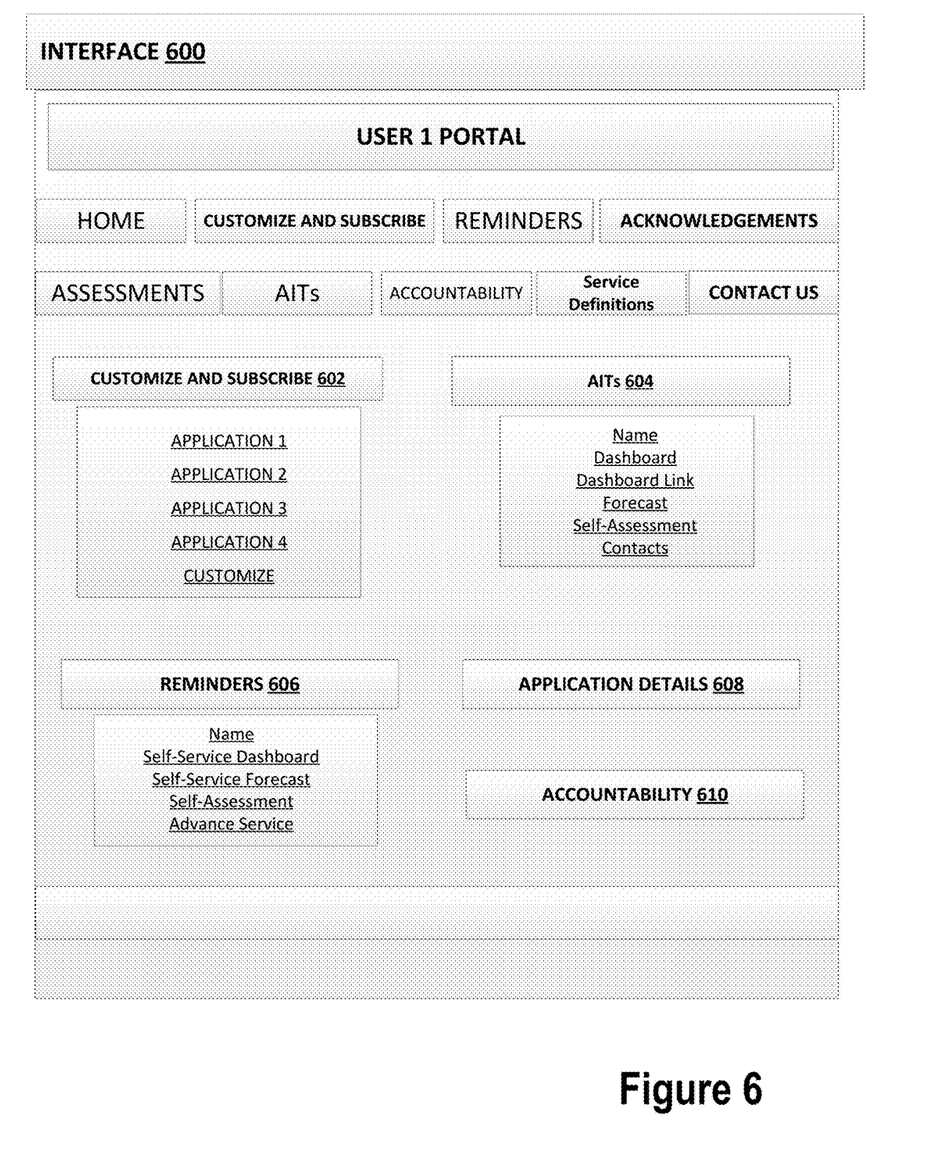
FIG. 6 provides an interface associated with the scalable service delivery workflow system, in accordance with embodiments of the invention.

FIG. 6 provides an interface associated with the scalable service delivery workflow system 600, in accordance with embodiments of the invention. As illustrated, interface 600 is a securely linked portal for an individual user based on the user authentication. In this case, the user is User 1. The interface 600 includes several tabs such as home, customize and subscribe, reminders, acknowledgements, assessments, AITs, service definitions, and contact us. The portal is designed for the user to customize and subscribe to midrange application. It offers a tracking mechanism for the applications thought reminders and status dashboards. The customize and subscribe tab 602 allows a user to select services associated with applications, customize applications, provide liaisons names, and select service start dates. The user can also receive email reminders for the selected applications. The customize and subscribe tab 602 provides check boxes to applications, such as Application 1, Application 2, Application 3, Application 4, and a selection for customizing the application.

The interface 600 includes a tab for reminders 606. The reminders allow a user to review elected applications and due dates associated with the applications. The reminders may be provided via the interface, email, text, or the like. Multiple reminders may be send at various times prior to the due date. Furthermore the reminders tab 606 provide data about reminders, such as the name of an application, self-service dashboards, self-service forecasts, self-assessments, and advanced services associated with the application.

The interface 600 includes an AITs tab 604. This tab allows a user to review application profiles, liaisons, application elected and frequencies. This also allows the user to customize the applications if desired. The AITs tab 604 includes the name of the application, dashboard link to the application, a forecast for the applications, a self-assessments for the applications, and/or a link for contacting the liaison for assistance with the application.

The acknowledgement tab allows a user to check the status of applications to if any action items are pending for the user. There is a color indication of green, amber, red, and gray to indicate scheduled or past-due requirements. Upon completion of the elected review, acknowledgment is directed to the user via communication and updates the interface.

The application details 608 provides the user or host with information associated with the application, include run time, levels throughout working periods, or the like. Finally, the interface 600 includes an accountability 610 tab. The accountability tab requires users that are signed up for the system to complete reviews and perform self-assessments for each application. The system or host may be able to monitor each of the one or more states of a self-assessment.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for customizable application building, servicing, and delivering, the system comprising:
a memory device with computer-readable program code stored thereon; a communication device;
a processor operatively coupled to the memory device and the communication device, wherein the processor is configured to execute the computer-readable program code to:
compile applications available across an entire entity into a centralized location database;
separate each function of the compiled applications and store each function separately;
generate an interface for user interaction, wherein the interface is provided to a user via a user device through a secure communicable link generated for interface interaction;
receive a request for a customized application via the interface, wherein the customized application includes applications and functions of applications;
deploy a liaison assigned to the user and the customized application and allow for user interaction with the liaison via the secure communicable link generated for the interface interaction for planning and implementing the customized application:
plan the customized application based on the received request, wherein planning the customized application comprises performing a capacity assessment of the user device, wherein the capacity assessment of the user device further comprises generation of a communicably linkage with the user device and using the communicable linkage to extract memory capacity and queue the memory capacity of the user device for the customized application and processing compatibility of the user device to ensure application functionality upon implementation;
implement the customized application on the user device, wherein implementation includes creating a second secure communicable link to transmit the customized application to the user device; and
track via coded tracking module inserted into the customize application for the entity audit and maintenance; and
synchronize the customized application with entity servers and coordinate update and maintenance requirements for the customized application.

2. The system of claim 1, further comprising:
receiving maintenance update products from one or more vendors for the applications;
incorporating a tracking module into the maintenance update products and apply maintenance update to an appropriate location within the entity information technology infrastructure;
generating a report of the progress of the maintenance update based on the executed tracking module for each of one or more maintenance update products applied within the entity; and
providing the user with the report of the progress of the maintenance update associated with the tracking module via the interface, wherein the provided report is based on a user query for the report.

3. The system of claim 1, wherein receiving the a request for a customized application via the interface further comprises receiving a request for one or more complete applications and a request for one or more functions of a second application.

4. The system of claim 1, wherein compiling applications available across the entity into a centralized location database further comprises extracting applications available for the entity from one or more vendors.

5. The system of claim 1, wherein compiling applications available across the entity into a centralized location database further comprises parting out the applications such that each function of the application is stored separately.

6. The system of claim 1, wherein implementing the customized application on the user device further comprises assigning and deploying a liaison to the user for application reconciliation.

7. A computer program product for customizable application building, servicing, and delivering, the computer program product comprising at least one non-transitory computer-readable medium having computer-readable program code portions embodied therein, the computer-readable program code portions comprising:
   an executable portion configured for compiling applications available across an entire entity into a centralized location database;
   an executable portion configured for separating each function of the compiled applications and store each function separately;
   an executable portion configured for generating an interface for user interaction, wherein the interface is provided to a user via a user device through a secure communicable link generated for interface interaction;
   an executable portion configured for receiving a request for a customized application via the interface, wherein the customized application includes applications and functions of applications;
   an executable portion configured for deploying a liaison assigned to the user and the customized application and allow for user interaction with the liaison via the secure communicable link generated for the interface interaction for planning and implementing the customized application;
   an executable portion configured for planning the customized application based on the received request, wherein planning the customized application comprises performing a capacity assessment of the user device, wherein the capacity assessment of the user device further comprises generation of a communicably linkage with the user device and using the communicable linkage to extract memory capacity and queue the memory capacity of the user device for the customized application and processing compatibility of the user device to ensure application functionality upon implementation;
   an executable portion configured for implementing the customized application on the user device, wherein implementation includes creating a second secure communicable link to transmit the customized application to the user device;
   an executable portion configured for tracking via coded tracking module inserted into the customize application for the entity audit and maintenance; and
   an executable portion configured for synchronizing the customized application with entity servers and coordinate update and maintenance requirements for the customized application.

8. The computer program product of claim 7, further comprising:
   an executable portion configured for receiving maintenance update products from one or more vendors for the applications;
   an executable portion configured for incorporating a tracking module into the maintenance update products and apply maintenance update to an appropriate location within the entity information technology infrastructure;
   an executable portion configured for generating a report of the progress of the maintenance update based on the executed tracking module for each of one or more maintenance update products applied within the entity; and
   an executable portion configured for providing the user with the report of the progress of the maintenance update associated with the tracking module via the interface, wherein the provided report is based on a user query for the report.

9. The computer program product of claim 7, wherein receiving the a request for a customized application via the interface further comprises receiving a request for one or more complete applications and a request for one or more functions of a second application.

10. The computer program product of claim 7, wherein compiling applications available across the entity into a centralized location database further comprises extracting applications available for the entity from one or more vendors.

11. The computer program product of claim 7, wherein compiling applications available across the entity into a centralized location database further comprises parting out the applications such that each function of the application is stored separately.

12. The computer program product of claim 7, wherein implementing the customized application on the user device further comprises assigning and deploying a liaison to the user for application reconciliation.

13. A computer-implemented method for customizable application building, servicing, and delivering, the method comprising: providing a computing system comprising a computer processor and a non-transitory computer readable medium, where the computer readable medium comprises configured computer program instruction code, such that when said instruction code is operated by said computer processor, said computer processor performs the following operations:
   compiling applications available across an entire entity into a centralized location database;
   separating each function of the compiled applications and store each function separately;
   generating an interface for user interaction, wherein the interface is provided to a user via a user device through a secure communicable link generated for interface interaction;
   receiving a request for a customized application via the interface, wherein the customized application includes applications and functions of applications;
   deploying a liaison assigned to the user and the customized application and allow for user interaction with the liaison via the secure communicable link generated for the interface interaction for planning and implementing the customized application;
   planning the customized application based on the received request, wherein planning the customized application comprises performing a capacity assessment of the user device, wherein the capacity assessment of the user device further comprises generation of a communicably linkage with the user device and using the communicable linkage to extract memory capacity and queue the memory capacity of the user device for the customized application and processing compatibility of the user device to ensure application functionality upon implementation;

implementing the customized application on the user device, wherein implementation includes creating a second secure communicable link to transmit the customized application to the user device; and tracking via coded tracking module inserted into the customize application for the entity audit and maintenance; and synchronizing the customized application with entity servers and coordinate update and maintenance requirements for the customized application.

14. The computer-implemented method of claim 13, further comprising:

receiving maintenance update products from one or more vendors for the applications;

incorporating a tracking module into the maintenance update products and apply maintenance update to an appropriate location within the entity information technology infrastructure;

generating a report of the progress of the maintenance update based on the executed tracking module for each of one or more maintenance update products applied within the entity; and providing the user with the report of the progress of the maintenance update associated with the tracking module via the interface, wherein the provided report is based on a user query for the report.

15. The computer-implemented method of claim 13, wherein compiling applications available across the entity into a centralized location database further comprises extracting applications available for the entity from one or more vendors.

16. The computer-implemented method of claim 13, wherein compiling applications available across the entity into a centralized location database further comprises parting out the applications such that each function of the application is stored separately.

17. The computer-implemented method of claim 13, wherein implementing the customized application on the user device further comprises assigning and deploying a liaison to the user for application reconciliation.

* * * * *